Nov. 3, 1942.                L. YOST                2,301,104

CABLE REEL

Filed March 24, 1941

Lloyd Yost
INVENTOR.

BY
ATTORNEY.

Patented Nov. 3, 1942

2,301,104

UNITED STATES PATENT OFFICE 2,301,104

CABLE REEL

Lloyd Yost, Los Angeles, Calif., assignor to A. O. Smith Corporation, Milwaukee, Wis., a corporation of New York Application March 24, 1941, Serial No. 384,886

6 Claims. (Cl. 191—12.4)

This invention relates to a cable reel.

An object of the invention is to provide an improved reel for electric cable used to convey electrical energy from near the reel to equipment at the far end of the cable unwound from it.

Another object of the invention is to provide an improved reel of this character with a locking device to prevent unauthorized rotation of the reel and removal or insertion of the connector to the cable.

Another object of the invention is to provide a reel which can be rotated only when the connector to the cable on the reel is removed.

A further object is to provide a reel such that the connector to the cable can be inserted only when the reel is locked against rotation.

These and other objects of the invention will be clear from the following detailed description and the drawing in which.

Figure 1:
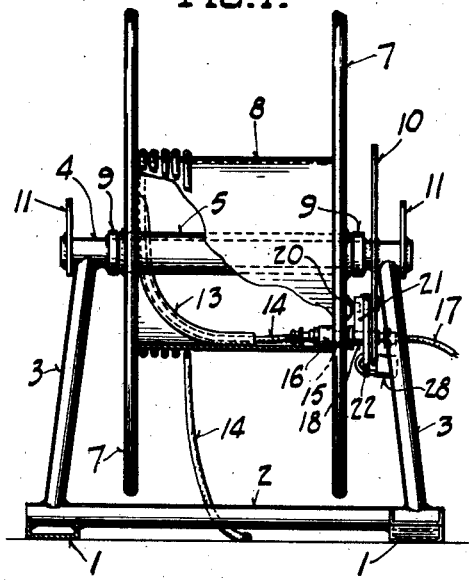
Figure 1 is a side elevation of the reel, partly in section.

Referring to the drawing, channel sections 1 are welded to tubular cross members 2 to form a base for the attachment of tubular supports 3. These carry the axle 4 which may be a section of pipe welded to supports 3.

The reel comprises a hub 5 which may be a section of pipe of the correct internal diameter to fit closely around the axle, spokes 6 welded to the hub and to rims 7, and a drum 8 welded to the spokes. The reel is positioned longitudinally on the axle by hub stops 9 welded to the axle. A circular guard plate 10 of somewhat greater diameter than the drum 8 is welded to the axle at one end. Lifting plates 11 with holes 12 for the insertion of hooks are desirably provided at the ends of the axle to facilitate the lifting of the reel by a crane or hoist. It is to be understood that the reel and other parts are assembled on the axle before this is welded to supports 3.

A tubular cable guide 13 is welded to the inside of the drum to guide the inner end of cable 14 smoothly from the outer surface of the drum to an electrical outlet 15 which is mounted in a short tube 16 welded to the drum. Connection to an external electrical circuit is made by cable 17 terminating at plug 18 which can be inserted into outlet 15 for the transmission of power, or withdrawn therefrom to permit the cable to be reeled upon or unreeled from the drum.

A plate 19 is welded to two of the spokes 6 to carry a locking pin 20 which projects outwardly from the reel towards plate 10. The purpose of the locking pin 20 is to engage arcuate locking flanges 21 welded to that face of the locking arm 22 which is turned towards the pin, and prevent rotation of the drum. The locking arm has a notch 23 at one side which is slightly larger than the body of plug 18, but smaller than the shoulder 24 on the plug.

Directly below the axle there is a hand hole 25 through guard plate 10. The hole is of sufficient size to permit the passage of shoulder 24 on plug 18, and is at such a distance from the axle that the electrical outlet 15 registers with it. Since the guard plate 10 is of larger diameter than the drum 8, it will be seen that the plug 18 can be inserted into outlet 15 only when this registers with hole 25.

Figure 5:
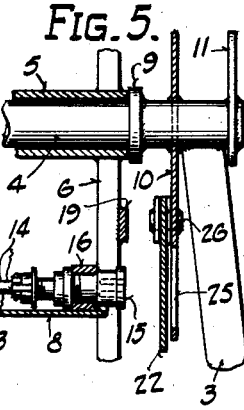
Fig. 5 is a similar section but with the latch in a different position.
Figure 7:
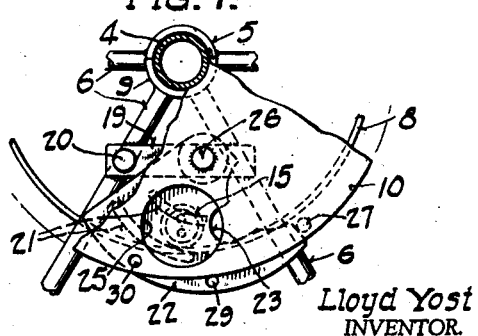

The locking arm 22 is pivotally mounted on pin 26, welded to plate 10, so as to be free to swing in its own plane between positions defined by axle 4 and stop 27 welded to plate 10. When the locking arm has its lowermost position, as shown in Figs. 5 and 7, it covers hole 25 and prevents insertion of the plug 18. The arcuate locking flanges 21 are not in the circular path of locking pin 20, so that there is no restraint on rotation of the reel and cable can be unreeled from or reeled onto the drum.

Figure 2:
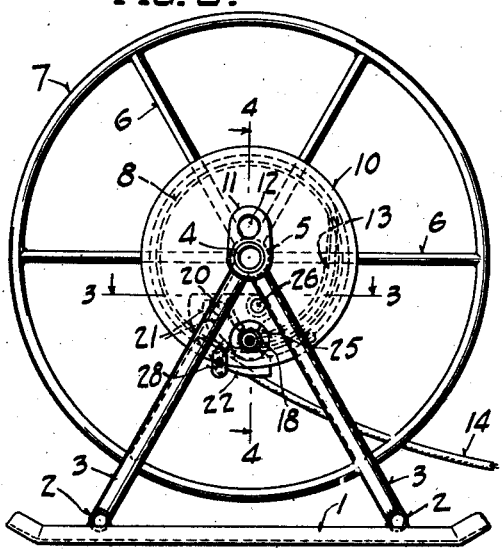
Fig. 2 is an end elevation looking from right to left in Fig. 1.
Figure 3:
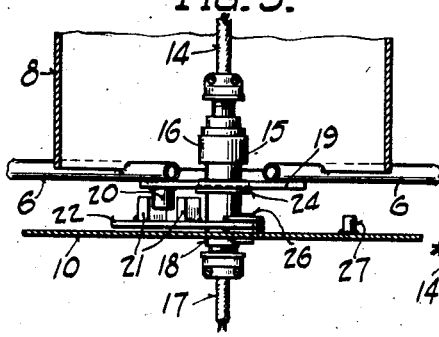
Fig. 3 is an enlarged section of the near end on the line 3—3 of Fig. 2.
Figure 4:
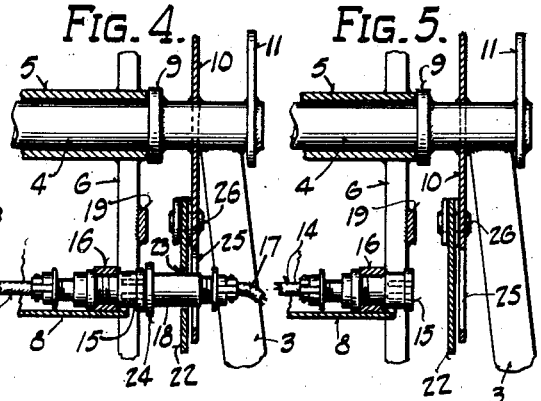
Fig. 4 is an enlarged section on line 4—4 of Fig. 2 showing the cable connector in place.
Figure 6:
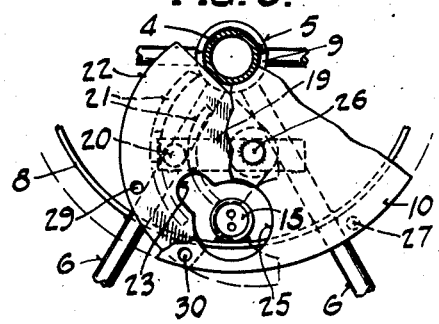
Figs. 6 and 7 are fragmentary end views showing the locking arm in open and closed positions respectively.

When a sufficient length of cable has been unrolled and it is desired to make electrical connection to the cable, the reel is turned to bring the electrical outlet 15 directly opposite hole 25. To permit insertion of plug 18, locking arm 22 must be swung to the left to uncover the hole 25 in plate 10 as shown in Fig. 6. When swung sufficiently to the left or against the shaft 4 to permit insertion of the plug, the locking flanges 21 on arm 22 engage pin 20 fastened to the reel and prevent its rotation in either direction. After the electrical connection has been made, arm 22 is returned slightly to the right and locked in place by a padlock 28 through holes 29 and 30, the first in arm 22 and the second in plate 10. The locking flanges 21 are of sufficient length to keep the small return movement from releasing pin 20. So long as the arm is locked in this position, as shown in Figs. 2, 3 and 4, the reel is locked against rotation in either direction, and, in addition, the shoulder 24 on plug 18 being larger than notch 23 in the locking arm 22, it is impossible to withdraw the plug and break the electrical connection.

When the padlock is removed, the lower end of latch 22 can be moved only to the left, movement to the right being prevented by plug 18. Movement to the left about pin 26 merely changes the position of locking flanges 21 relative to pin 20 but does not release the pin and permit rotation of the reel. It does, however, remove the notch from around plug 18 and allows the plug to be withdrawn, after which the latch is dropped downward and to the right against stop 27, into the position shown in Fig. 7, to free the pin 20 from flanges 21 and permit rotation of the reel. The plate 22 in this position covers outlet 15 and may be locked to prevent unauthorized electrical connection with the cable.

Various embodiments of the invention may be employed within the scope of the accompanying claims.

I claim:

1. A reel for electric cable comprising a rotatable drum on which the cable is wound, an electric connector adjacent one end connected to cable on the drum and adapted to receive a matching connector on a cable exterior to the drum, a fixed guard plate disposed transverse to the axis of the drum at the end adjacent the connector and of sufficient size to cover the circular path traversed by the connector on the drum when this is rotated, an opening through the guard plate registering with the connector on the drum in one of its angular positions to provide for the insertion of a connector on a cable external to the reel, a locking pin rigidly secured to the drum on which the cable is wound at the end adjacent the guard plate, a locking arm pivotally mounted on the guard plate arranged to cover the opening in the guard plate and prevent insertion of the external connector when the locking arm is in a position to provide for free rotation of the drum, locking cams mounted on the locking arm to engage the locking pin on the drum and prevent rotation of the drum when the locking arm is swung to a position in which it clears the opening in the guard plate to provide for insertion of the external connector, means to lock the locking arm in a position in which the cams engage the locking pin and hold the drum against rotation, and means to prevent insertion or removal of the external connector when the locking arm is locked.

2. In a reel for electric cable having a rotatable drum on which the cable is wound, a connector on the cable wound on the drum, a guard plate with an opening to prevent the making of an external electrical connection to the connector on the drum except when this registers with the opening in the plate, a locking pin on the drum, a locking arm pivotally mounted on the guard plate, and locking cams on the locking arm disposed to clear the locking pin and permit free rotation of the drum when the locking arm is in a position to cover the opening in the guard plate and to engage the locking pin and prevent rotation of the drum when the locking arm is in a position to uncover the opening in the guard plate and expose the connector to the cable on the drum so that electrical connection can be made to it.

3. In a reel for electric cable having a rotatable drum on which the cable is wound, a connector on the cable wound on the drum, a guard plate with an opening to prevent the making of an external electrical connection to the connector on the drum except when the connector is in registry with the opening in the guard plate, a stop on the drum, a locking arm pivotally mounted on the guard plate, and means on the locking arm disposed to free the stop on the drum and permit rotation of the drum when the locking arm is in a position to cover the opening in the guard plate and to engage the stop and to prevent rotation of the drum when the locking arm is in a position to uncover the opening in the guard plate and expose the connector on the drum so that electrical connection can be made to it.

4. In combination a reel for electric cable having a rotatable drum, electric cable wound on the drum, an electrical connector on the end of the cable secured to the drum, a connector on another electric cable adapted to engage the connector on the drum and electrically connect the two cables, a stop on the second connector, a guard plate with an opening to prevent the making of a connection except when the connector on the drum is in registry with the opening in the guard plate, a stop on the drum, a locking arm pivotally mounted on the guard plate, means on the locking arm disposed to free the stop on the drum and permit rotation of the drum when the locking arm is in a position to cover the opening in the guard plate and to engage the stop and prevent rotation of the drum when the locking arm is in a position to uncover the opening in the guard plate and expose the connector on the drum so that the second connector can be engaged with it.

5. In combination, a rotary drum for receiving an electric cable to be wound thereon, means on the drum for connecting the inner end of the cable to a plug on a second electrical cable, and means including a stationary member having an opening for receiving said plug and a movable locking member for simultaneously locking the drum against rotation and the plug against removal through said opening.

6. In combination, a rotary drum for receiving an electric cable to be wound thereon, a relatively stationary support for said drum, connecting means for connecting the inner end of the cable on the drum to the end of an external cable when the drum is held against rotation, means to lock said drum against rotation, and means constituting a part of the locking means to render said connecting means inoperable at all times except when said drum is locked against rotation.

LLOYD YOST.